United States Patent
Kassuelke et al.

(10) Patent No.: US 6,241,506 B1
(45) Date of Patent: *Jun. 5, 2001

(54) COMPRESSION MOLD

(75) Inventors: Gregory T. Kassuelke, Maple Grove; Stephen A. Haglund, Minnetonka; Robert E. Long, Chanhasson Hills, all of MN (US)

(73) Assignee: Alliant Techsystems Inc., Hopkins, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,931

(22) Filed: Sep. 29, 1998

(51) Int. Cl.[7] .................... B29C 43/04; F42B 1/08
(52) U.S. Cl. .................... 425/412; 86/21; 264/3.1; 425/398
(58) Field of Search .................... 425/128, 412, 425/398, 400; 264/3.1; 86/21

(56) References Cited

U.S. PATENT DOCUMENTS

| | | | |
|---|---|---|---|
| 3,124,092 | * 3/1964 | Raynes | 425/398 |
| 3,694,859 | * 10/1972 | Glasman | 19/144 S |
| 3,795,473 | * 3/1974 | Holik | 425/506 |
| 5,188,650 | * 2/1993 | Nomura | 65/64 |
| 5,635,660 | * 6/1997 | McGovern | 86/21 |
| 5,640,054 | 6/1997 | McGovern | 264/3.1 |
| 5,747,725 | 5/1998 | Stewart et al. | 102/521 |
| 5,789,699 | 8/1998 | Stewart et al. | 102/521 |

* cited by examiner

*Primary Examiner*—Harold Pyon
*Assistant Examiner*—Emmanuel S. Luk
(74) *Attorney, Agent, or Firm*—George A. Leone

(57) ABSTRACT

A compression mold apparatus for compressing a segment has a base having an elongated and substantially semi-circular mold cavity and an end plate including a blade mounted thereon. The mold cavity has a top opening. A ram is aligned with the top opening. The ram includes two fixed opposing planar flank surfaces. The two fixed opposing planar flank surfaces are nominally centrally separated by a ram groove for mating with the blade while allowing linear movement within the mold cavity. A ram press is connected to the ram for translating the ram linearly along the blade within the mold cavity. A plurality of cartridge heaters is mounted in the base and arranged around the mold cavity for heating the segment.

14 Claims, 3 Drawing Sheets

COMPRESSION MOLD

FIELD OF THE INVENTION

The present invention is generally related to compression molds, and in particular to compression molds for forming segmented cylinders with unidirectional carbon fiber in a thermoplastic or thermoset prepreg.

BACKGROUND OF THE INVENTION

Fiber reinforced thermoplastic or thermoset material, commonly referred to as thermoplastic or thermoset prepreg, or simply, prepreg, is used in the construction of structural parts for various devices. Prepreg has the advantages of being strong and rigid, yet lightweight, and thus, prepreg is used to make devices for aerospace, military, electrical and computer science applications.

Prepreg materials generally consist of carbon or glass fibers impregnated within an epoxy or thermoplastic resin that is often formed into unidirectional rolled goods or other shaped ply. The fibers within the ply are oriented according to the device being constructed to provide the various structural parts of the device with the requisite strength and rigidity. Ply orientation is determined by the cut of the material. A ply is strongest in the direction of its fiber alignment. Thus, a portion of the fibers is aligned parallel to the direction in which strength is required by the structural part.

Usually, several plies with different, but specifically designed, fiber orientations are assembled into a multi-ply assembly. Moreover, several multi-ply assemblies are then stacked on top of each other to compose a laminate, or layup, with a specific orientation of fibers to bolster the structural integrity of the part under construction. The layup is then cut into composite pieces and assembled into a prepreg wedge to form a particular structural part of the device under construction. Assembly of the prepreg wedge requires stacking and welding the composite pieces in sequence and orienting the pieces according to a geometry envelope. Typically, a plurality of prepreg wedges is compression molded to form one composite segment of the part under construction and several composite segments are assembled to form the entire part. One area where segment molding is used frequently is in the construction of segmented cylinders.

For some useful applications, including composite sabots, compression molding of a segmented cylinder generally requires that sufficient prepreg wedges be loaded into a mold cavity to form a 120-degree composite segment of the cylinder, wherein three 120-degree composite segments form the entire cylinder. Subsequently, the mold cavity is heated and a press applies pressure to mold the prepreg wedges together. Heat from the mold cavity brings the thermoplastic or thermoset of the prepreg to its melting point. As the thermoplastic or thermoset melts, it flows and carries the composite fibers with the flow. However, as stated hereinabove, the prepreg kits have been structurally designed with specific fiber orientations and the fiber orientations must be maintained during segment molding to maintain the structural integrity of the part. If the mold that is holding and compressing the prepreg wedges applies force at the wrong time or in the wrong direction, the result is an unacceptable part with inadequate structural integrity.

Several methods have been attempted to mold cylinders using segmented compression molding of prepreg wedges. One conventional method uses a solid press, or solid ram, that matches the geometry of the cylinder segment to exert vertical pressure across the entire segment, including the center and opposing radial flanks of the cylinder segment. However, the vertical downward pressure from the solid ram across the center of the segment sometimes causes pressure in the wrong direction at the wrong time, resulting in misalignment of the fibers. The solid press also causes the wedges to warp and create air pockets and voids.

One apparatus and method known in the art is one that uses a hinged wing mold to compress the cylindrical segment such as is described in U.S. Pat. No. 5,635,660 entitled "Sabot Segment Molding Apparatus," to McGovern. McGovern's hinged wing mold comprises a mold channel and a hinged wing assembly, wherein a plurality of wedges are loaded into the mold channel. The hinged wing assembly comprises a pair of moveable articulated wings and a wing hinge, wherein wing hinge is secured coaxially along the length of mold channel to prevent downward vertical pressure to wedges. When the hinged wing assembly, motivated by a pressure cylinder, applies force to wedges to mold a segment the moveable articulated wings rotate about the hinge pin towards each other.

Another alternate method known in the art is one that uses a bag wing mold to compress the cylindrical segment. FIG. 2 shows a bag wing mold 200 of the prior art designed by Alliant Techsystems Inc. Bag wing mold 200 comprises a mold channel 220 and a bag wing assembly 250, wherein a plurality of wedges 210 is loaded into mold channel 220. Bag wing assembly 250 comprises a pair of moveable articulated wings 240 and a bag hinge 242, wherein bag hinge 242 is secured coaxially along the length of mold channel 220 to prevent downward vertical pressure to wedges 210. Bag wing assembly 250, motivated by a pressure cylinder 202, applies force through pressure block 204 to prepreg wedges 210 to mold a segment 212.

As demonstrated above, the design of a compression mold is critical to the production of a structurally superior segmented cylinder. Unfortunately, compression molds of the prior art, some using moveable articulated wings, sometimes do not apply forces in a correct or timely manner. For example, devices of the prior art may exert undue downward pressure across the center of a formed segment, or unequal pressure to the opposing radial flanks of the segment. Such undesirable misapplications of pressure may cause anomalous compression, resulting in misalignment, bending, or breakage of the composite fibers within the prepreg. Misaligned, bent, or broken fibers all contribute to the structural degradation of the segment. Further, use of such prior art compression molds may exert pressure in such a way that may also cause the prepreg plies and wedges of a segment being formed to warp and create air pockets or voids within the segment. Warpage and voids also contribute to the structural degradation of the segment.

SUMMARY OF THE INVENTION

In accordance with the present invention a compression mold apparatus for compressing a segment comprises a base having an elongated and substantially semicircular mold cavity and an end plate including a blade mounted thereon, wherein the mold cavity has a top opening. A ram is aligned with said top opening. The ram includes two fixed opposing planar flank surfaces. The two fixed opposing planar flank surfaces are nominally centrally separated by a ram groove for mating with said blade while allowing linear movement within the mold cavity. A ram press is connected to the ram for translating said ram linearly along said blade within said mold cavity. A plurality of cartridge heaters are mounted in said base and arranged around the mold cavity for heating the segment. The cartridge heaters are designed to meet the material requirements for melt and/or cure temperatures.

It is an object of the present invention to provide an apparatus for, and method of, compression molding fiber reinforced thermoplastic or thermoset prepreg material into a composite segment using a new compression apparatus, wherein the structural integrity of the composite segment is maintained.

It is an object of the present invention to provide a method of compression molding fiber reinforced thermoplastic or thermoset prepreg material into a composite segment using a new compression apparatus, wherein the fiber orientation of the prepreg is substantially maintained.

It is another object of the present invention to provide a method of compression molding for reducing breaking and bending of composite fibers within the thermoplastic or thermoset prepreg material of a composite segment caused by conventional compression molding.

It is another object of the present invention to provide a method of compression molding for reducing warping of thermoplastic or thermoset prepreg material within a composite segment caused by conventional compression molding.

It is another object of the present invention to provide a method of compression molding so as to reduce voids and cavities within a composite segment caused by conventional compression molding.

Other objects, features and advantages of the present invention will become apparent to those skilled in the art through the description of the preferred embodiment, claims and drawings wherein like numerals refer to like elements.

DETAILED DESCRIPTION OF THE INVENTION

Figure 1:
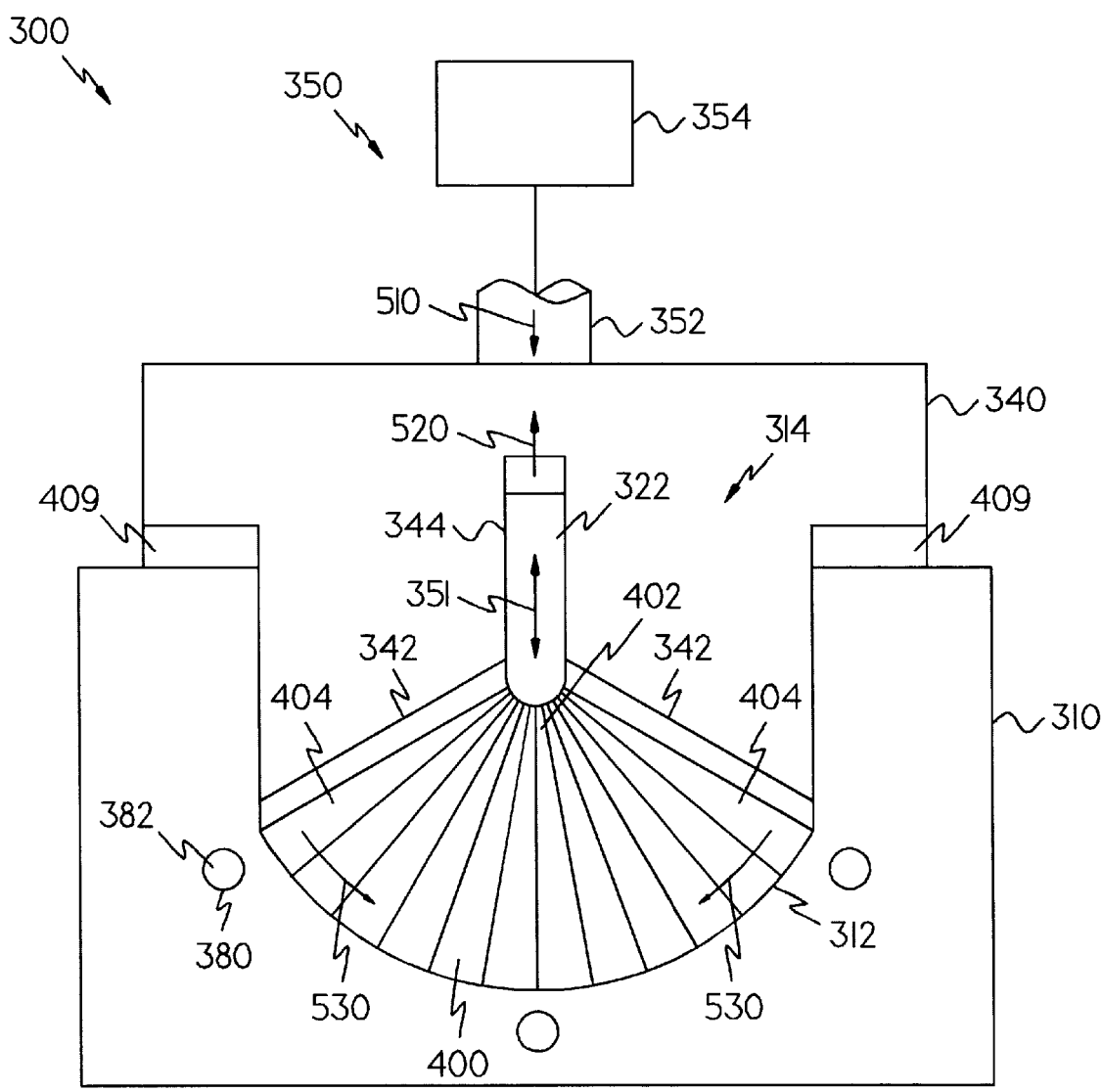
FIG. 1 is a front sectional view of a compression mold apparatus of the present invention with a ram in an open position.
Figure 2:
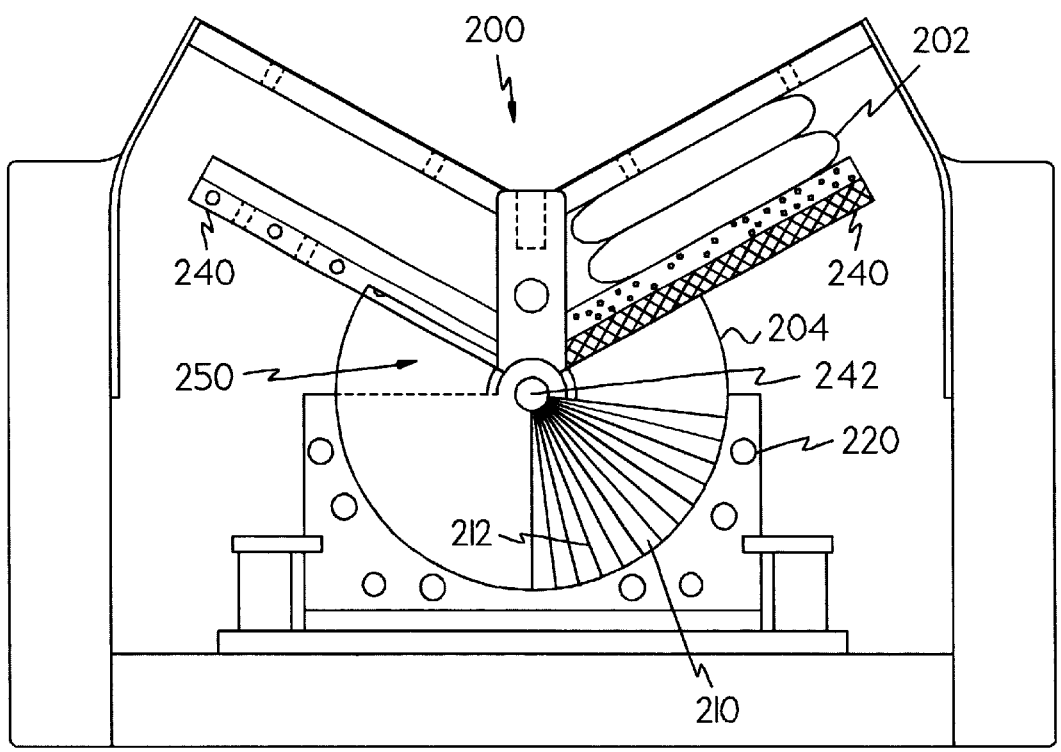
FIG. 2 is a front sectional view of a prior art bag wing mold.

Now referring to FIG. 1, FIG. 1 is a front sectional view of a compression mold apparatus 300 of the present invention. Compression mold apparatus 300 comprises an elongated rectangular base 310 with an elongated substantially semi-circular mold cavity 312 and an end plate 409. A blade 322 is advantageously mounted to the end plate 409. In one useful embodiment, compression mold apparatus 300 is fabricated from INVAR metal to match the thermal expansion of the material to be molded. However, those skilled in the art having the benefit of this disclosure will understand that compression mold apparatus 300 may be made from a wide array of metals and alloys to serve the intended purpose of this invention.

A ram 340, with a pair of fixed opposing planar flank surfaces 342, has a ram groove 344 that slidingly mates with blade 322. A ram press 350 is connected to ram 340. In operation, ram press 350 moves to vertically translate ram 340 along blade 322 and above base mouth 314 as indicated by ram press motion arrow 351. Ram press 350 comprises a piston 352 mounted to ram 340 and a ram motor 354 mounted to piston 352, wherein ram motor 354 operates to actuate piston 352 to vertically translate ram 340.

Figure 3:
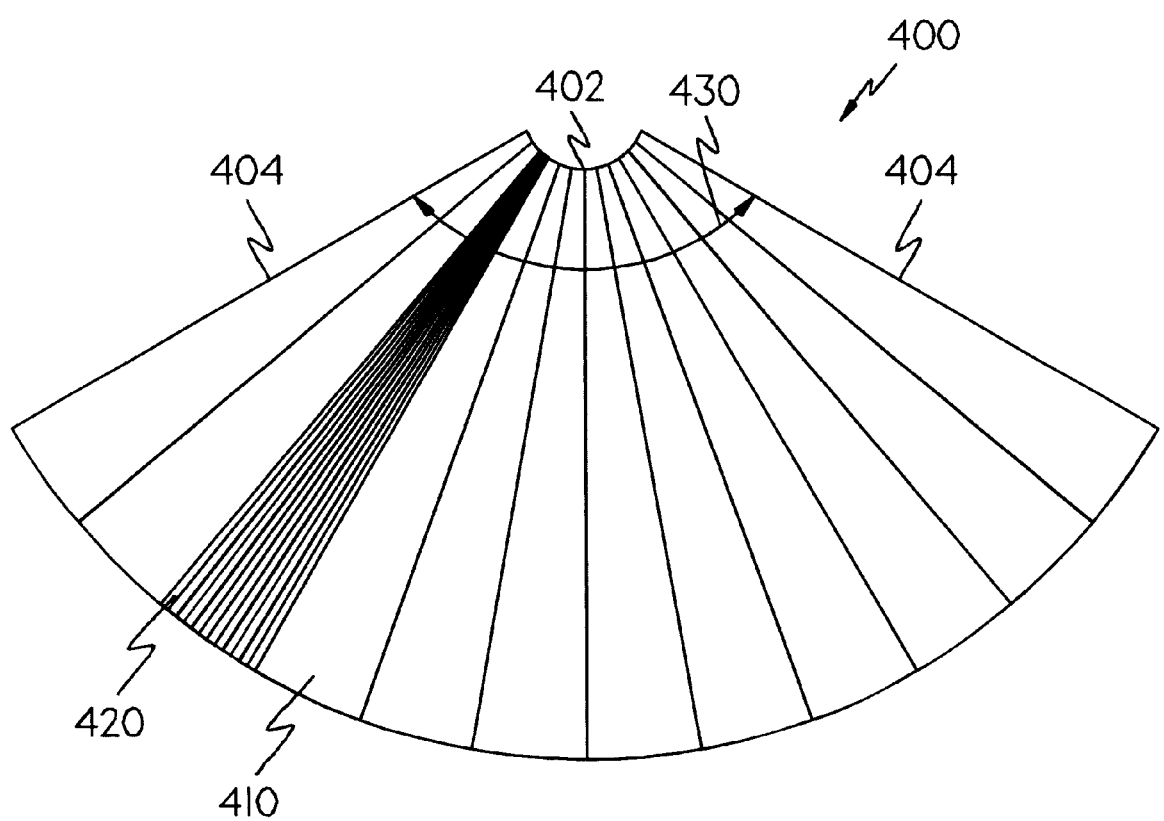
FIG. 3 is a front sectional view of a segment of the present invention.

Now referring jointly to FIGS. 1 and 3, a segment 400 loads within mold cavity 312 and includes a central section 402 and a pair of flank sections 404. Further, segment 400 comprises a plurality of prepreg wedges 410, wherein prepreg wedges 410 comprise a plurality of prepreg plies 420. In one useful embodiment, prepreg plies 410 are made of fiber reinforced thermoplastic or thermoset material. However, those skilled in the art having the benefit of this disclosure will understand that prepreg plies 410 can be made of any thermally formable composite material.

In one useful embodiment, prepreg wedges 410 comprise unidirectional carbon fiber in a thermoplastic or thermoset prepreg. Prepreg wedges 410 are radially placed against each other to compose segment 400. In one useful embodiment, segment 400 has a segment span 430 of about 120 degrees nominally comprising twelve 10-degree prepreg wedges 410. Those skilled in the art having the benefit of this disclosure will understand that segment span 430 may be any angle within a range of angles below 180 degrees with a corresponding number of prepreg wedges 410. It follows that the a pair of fixed opposing planar flank surfaces 342 are advantageously symmetrically disposed around the ram groove 344 at an angle of less than 180 degrees with respect to each other. In a more preferred embodiment the a pair of fixed opposing planar flank surfaces 342 are symmetrically disposed at a predetermined angle with respect to each other. In some useful embodiments, the predetermined angle may advantageously be any suitable value from at least 30° but less than 180°, or increments in between these angles.

Once segment 400 is retained by ram 340, a plurality of cartridge heaters 382, inserted within base 310 through a plurality of heater tubes 380, heat mold cavity 312. Each of the plurality of cartridge heaters 382 are individually wound to provide required heat energy to the cavity mold 312. Using standard fabrication techniques known in the art, the plurality of cartridge heaters 382 are wound to vary in Watt density to match the geometry of mold cavity 312 and material requirements. When the compression mold is operated, the plurality of cartridge heaters 382 heat mold cavity 312 until the thermoplastic or thermoset resin within prepreg wedges 410 begins to melt. Simultaneously, ram 340 slides down blade 322 so that surface flanks 342 contact segment 400 within base 310 and ram 340 in cooperation with base 310 compresses segment 400.

Now referring again particularly to FIG. 1, a piston force 510 from piston 352 operates to force ram 340 downward along blade 322 so that flank surfaces 342 contact segment 400. Flank surfaces 342 advantageously create compression forces 530 directed circumferentially on flank sections 404 to fully compress segment 400. In turn, blade 322 creates a normal force 520 directed vertically upward on ram 340, because ram groove 344 terminates after surface flanks 342 contact flank sections 404. Normal force 520 advantageously prevents ram 340 from exerting force on central section 402 of segment 400. Normal force 520 thereby prevents misalignment, bending, and breaking of fibers within segment 400 and maintains the structural integrity of segment 400 after its compression into a device part. Moreover, normal force 520 advantageously prevents prepreg wedges 410 from buckling and warping, thereby avoiding cavities between prepreg plies 420 (shown in FIG. 3) and maintaining the structural integrity of segment 400 after its compression into a device part.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

More specifically, materials for compression mold apparatus 300 may be chosen from a wide array of materials to serve the intended purpose. The material may be selected from a wide array of metallic materials and alloys to serve the intended function and accommodate manufacturing processing to achieve the integral structure as indicated herein.

Moreover, materials for prepreg plies 420 may be chosen from a wide array of materials to serve the intended purpose. The material may be selected from a wide array of fibrous materials including carbon, graphite, and fiberglass. Thermoset or thermoplastic resins may be used to serve the intended function and accommodate manufacturing processing to achieve the integral structure as indicated herein. These and other. modifications are all within the true spirit and scope of the present invention.

What is claimed is:

1. A compression mold apparatus for compressing a segment, the compression mold apparatus comprising:

a base having an elongated and substantially semi-circular mold cavity and an end plate including a blade mounted thereon, wherein the mold cavity has a top opening;

a ram aligned with said top opening, the ram including two fixed opposing planar flank surfaces, and a ram groove, said two opposing planar flank surfaces being separated by said ram groove for mating with said blade while allowing linear movement within the mold cavity, wherein said fixed opposing planar flank surfaces are disposed at a predetermined fixed angle with respect to each other so as to prevent rotation of said opposing flank surfaces;

a ram press affixed to the ram for translating said ram linearly along said blade within said mold cavity; and a plurality of cartridge heaters mounted in said base arranged around the mold cavity for heating the segment.

2. The compression mold apparatus of claim 1 wherein said ram press further comprises a piston mounted to said ram for translating said ram linearly along said blade.

3. The compression mold apparatus of claim 1 wherein said predetermined fixed angle is fixed from at least 30° to less than 180°.

4. An apparatus for compression molding a sabot segment comprising:

means for containing a sabot segment in a mold cavity;

means for applying a predetermined compression force to said sabot segment wherein said compression force applying means includes a pair of fixed opposing planar flank surfaces positioned in relation to said containing means for bearing on the sabot segment, wherein said fixed opposing planar flank surfaces are disposed at a predetermined fixed angle with respect to each other so as to prevent rotation of said opposing flank surfaces;

means for applying a predetermined urging force on said compression force applying means; and means for heating the mold cavity, wherein the heating means is located within said containing means.

5. The apparatus of claim 4 wherein the means for containing a segment in a mold cavity further comprises an elongated and substantially semi-circular mold cavity.

6. The apparatus of claim 4 wherein the a pair of fixed opposing planar flank surfaces are disposed at an angle of less than 180 degrees with respect to each other.

7. The apparatus of claim 4 wherein the means for containing a sabot segment in a mold cavity includes a means for guiding linear movement, and the pair of fixed opposing planar flank surfaces are separated by a ram groove for mating with said means for guiding linear movement within the mold cavity.

8. The apparatus of claim 7 wherein the a pair of fixed opposing planar flank surfaces are disposed at an angle of less than 180 degrees with respect to each other.

9. The apparatus of claim 7 wherein the a pair of fixed opposing planar flank surfaces are disposed at an angle of at least 120 degrees with respect to each other.

10. A compression mold apparatus for compressing a segment, the compression mold apparatus comprising a base having a mold cavity, an end plate including a blade mounted thereon, a ram, the ram including two fixed opposing planar flank surfaces separated by a ram groove for mating with said blade while allowing linear movement within the mold cavity, wherein said fixed opposing flank surfaces are disposed at a predetermined fixed angle with respect to each other so as to prevent rotation of the opposing flank surfaces, a ram press for translating said ram linearly along said blade toward said mold cavity to compress the segment, and heaters, located within the base, for heating the segment in said mold cavity.

11. The compression mold apparatus of claim 10 wherein said mold cavity is elongated and substantially semicircular.

12. The compression mold apparatus of claim 10 wherein said two fixed opposing flank surfaces are disposed at an angle of less than 180 degrees with respect to each other.

13. The compression mold apparatus of claim 10 wherein said ram press further comprises a piston mounted to said ram for translating said ram vertically along said blade and a ram motor mounted to said piston for actuating said piston.

14. The compression mold apparatus of claim 10 wherein said heaters further comprise a plurality of cartridge heaters mounted in said base.

\* \* \* \* \*